US010535043B2

(12) United States Patent
Fernandes et al.

(10) Patent No.: US 10,535,043 B2
(45) Date of Patent: Jan. 14, 2020

(54) NAVIGATING A CALENDAR

(71) Applicant: Microsoft Technology Licensing, LLC, Redmond, WA (US)

(72) Inventors: Kirk Fernandes, Seattle, WA (US); Kathryn Elizabeth Suskin, Seattle, WA (US); Zachary Justin Miller, Bellevue, WA (US); Robert Meyer, Seattle, WA (US); Nelson Siu, Kirkland, WA (US); Choon-mun Hooi, Seattle, WA (US); Jonathan Cadiz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 13/914,330

(22) Filed: Jun. 10, 2013

(65) Prior Publication Data
US 2014/0365951 A1    Dec. 11, 2014

(51) Int. Cl.
*G06Q 10/10* (2012.01)
(52) U.S. Cl.
CPC .................................. *G06Q 10/109* (2013.01)
(58) Field of Classification Search
CPC ......................... G06F 3/04842; G06Q 10/109
USPC ................................................. 715/863, 781
See application file for complete search history.

(56) References Cited

U.S. PATENT DOCUMENTS 8,069,417 B2    11/2011  Brush et al.
8,327,272 B2    12/2012  Anzures et al.
8,402,380 B2     3/2013  Kikin-Gil et al.
2006/0026521 A1*  2/2006  Hotelling et al. ............ 715/702
2009/0158173 A1*  6/2009  Palahnuk ............... G06Q 30/00
                                                             715/753

(Continued)

FOREIGN PATENT DOCUMENTS

CN          101072196 A     11/2007
CN          102750605 A     10/2012
CN          102981745 A      3/2013

OTHER PUBLICATIONS

Siripornmongkol, Rungroj. "S planner Function by Pinch to Zoom in Samsung Galaxy Note", https://www.youtube.com/watch?v=FupZTKAu7Cl, Uploaded on Nov. 13, 2011, Duration: 00:32 seconds.*

(Continued)

*Primary Examiner* — John T Repsher, III

(57) ABSTRACT

A calendar view smoothly and progressively transitions between different calendar views. Instead of snapping to a week view in response to changing from a month view to the week view, the month view progressively transitions to the week view while receiving an interaction. For example, the week view may smoothly expand while the view of the other weeks in the month smoothly decrease in size while the interaction is being received. A user may navigate between different calendar views such as year to month, month to week, week to multiple days, days to single days, and the like. When navigating month to month, week to week, day to day, and the like, the transitions between each time element are progressively and smoothly transitioned. Task information or other information that is displayed in the calendar progressively transitions to show more or less information depending on the interaction being received.

20 Claims, 15 Drawing Sheets

(56) References Cited

U.S. PATENT DOCUMENTS

| | | | |
|---|---|---|---|
| 2010/0070888 A1 | 3/2010 | Watabe et al. | |
| 2011/0078622 A1* | 3/2011 | Missig | G06F 3/0486 715/784 |
| 2011/0202866 A1 | 8/2011 | Huang et al. | |
| 2011/0279384 A1* | 11/2011 | Miller | G06F 3/04883 345/173 |
| 2011/0283188 A1* | 11/2011 | Farrenkopf | G06F 3/0488 715/702 |
| 2012/0052921 A1 | 3/2012 | Lim et al. | |
| 2012/0204123 A1* | 8/2012 | Bauer et al. | 715/772 |
| 2014/0036639 A1* | 2/2014 | Boni et al. | 368/29 |
| 2014/0059487 A1* | 2/2014 | Baumann | G06F 3/0482 715/811 |

OTHER PUBLICATIONS

Rivett, Vaughen. "basic navigation of Lotus Notes Calendar views", https://www.youtube.com/watch?v=fbmt_-ez4_o, Uploaded on Feb. 3, 2008, Duration: 3m29s.*

Bederson, et al., "A Fisheye Calendar Interface for PDAs: Providing Overviews for Small Displays", In Proceeding of the Extended Abstracts of the Conference on Human Factors in Computing Systems, Apr. 5, 2003, 9 pages.

Bederson, et al., "Jazz: An Extensible Zoomable User Interface Graphics Toolkit in Java", In Proceedings of the 13th Annual ACM Symposium on User Interface Software and Technology, Nov. 5, 2000, 11 pages.

Gutwin, et al., "Interacting with Big Interfaces on Small Screens: a Comparison of Fisheye, Zoom, and Panning Techniques", In Proceedings of Graphics Interface, May 17, 2004, 8 pages.

"Calender Pad—Android", Retrieved on: Apr. 22, 2013, Available at: http://www.appszoom.com/android_applications/productivity/calendar-pad_bjvc.html.

Mackinlay, et al., "Developing Calendar Visualizers for the Information Visualizer", In Proceedings of the ACM Symposium on User Interface Software and Technology, Nov. 2, 1994, 10 pages.

"About Datelens", Retrieved on: Apr. 23, 2013, Available at: http://www.cs.umd.edu/hcil/datelens/.

"Search Report and Written Opinion Issued for PCT Patent Application No. PCT/US2014/040176", dated Mar. 2, 2015, 7 Pages.

European Supplemental Search Report cited in Application No. 14733028.6 dated Feb. 6, 2017, 8 pgs.

European Office Action dated Oct. 17, 2017 cited in Application No. 14 733 028.6, 6 pgs.

"First Office Action and Search Report Issued in Chinese Patent Application No. 201480032925.2", dated Jan. 28, 2019, 10 Pages.

"Second Office Action Issued in Chinese Patent Application No. 201480032925.2", dated Jul. 1, 2019, 6 Pages.

* cited by examiner

April 2013 310

| Sunday | Monday | Tuesday | Wednesday | Thursday | Friday | Saturday |
|---|---|---|---|---|---|---|
| 14 | 15 | 16 | 17 | 18 | 19 | 20 |
| | | 230PM Meet | 1PM Appoin / 230PM Meet / 245PM Meet | | | |

320

April 2013 350

| Su | M | Tuesday | Wednesday | Thursday | F | S |
|---|---|---|---|---|---|---|
| 14 | 15 | 16 | 17 | 18 | 19 | 20 |
| | | 230PM Meeting | 1PM Appointment / 230PM Meet / 245PM Meet | | | |

April 2013 410

| Tuesday | Wednesday | Thursday |
|---|---|---|
| 16 | 17 | 18 |
| 230PM Meeting | 1PM Appointment | |
| | 230PM Meeting / 245PM Meeting | |

420

April 2013 450

| Tuesday | Wednesday | Thursday |
|---|---|---|
| 16 | 17 | 18 |
| 230PM Meeting | 1PM Appointment | |
| | 230PM Meeting / 245PM Meeting | |

Mobile Computing Device

NAVIGATING A CALENDAR

BACKGROUND

Calendar applications are commonly used by computer users. The different calendar applications may include a variety of different features. For example, a user may share a calendar with other users, set appointments using the calendar, look at appointments using different views (e.g. day view, week view, month view, . . . ), as well as perform other operations. Navigating an electronic calendar is similar to interacting with a printed calendar. For example, a user may change the current month displayed by selecting another month as if they were turning a page of the printed calendar.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A calendar view smoothly and progressively transitions between different calendar views. Instead of snapping to a week view in response to changing from a month view to the week view, the month view progressively transitions to the week view. For example, the week view may smoothly expand while the view of the other weeks in the month smoothly decrease in size while an interaction to change the view is being received. A user may navigate between different calendar views such as from: year to month, month to week, week to multiple days, days to single days, and the like. When navigating month to month, week to week, day to day, and the like, the transitions between each different time period are progressively transitioned (e.g. smoothly scrolled between the different time periods). Task information or other information that is displayed in the calendar progressively transitions to show more or less information depending on the interaction being received. For example, when a size of the day is being expanded, more information may be shown with the display of the day. When a display of the day is shrinking in size, less information may be shown with the display of the day.

BRIEF DESCRIPTION OF THE DRAWINGS

FIG. 3 shows navigating between a week view and a multi-day view;

FIG. 4A and FIG. 4B shows navigating between a multi-day view and a day view.

FIG. 5 shows navigating between a year view and a month view;

DETAILED DESCRIPTION

Figure 1:
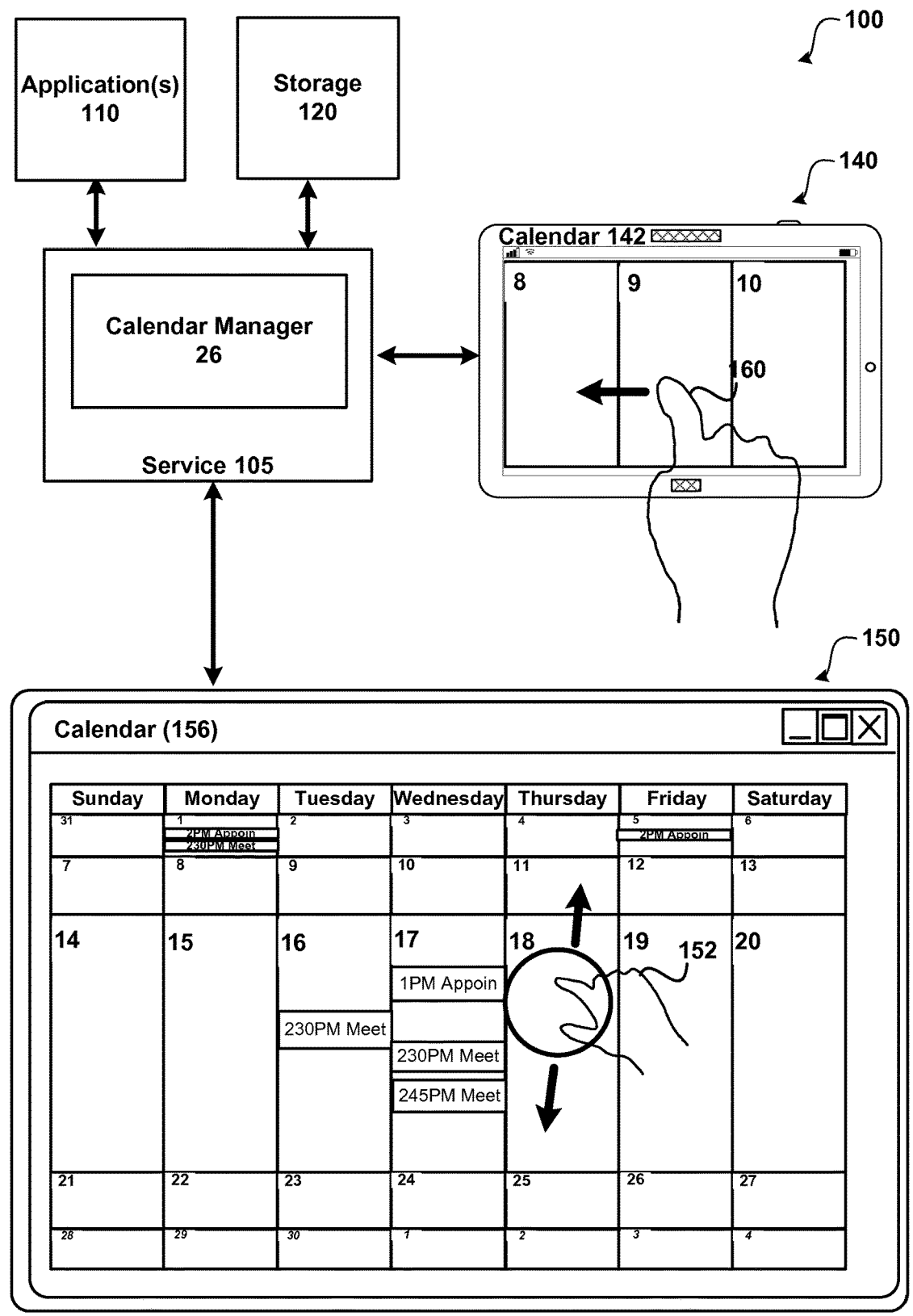
FIG. 1 shows a system for navigating a calendar.

Referring now to the drawings, in which like numerals represent like elements, various embodiment will be described elements, various embodiment will be described.

FIG. 1 shows a system for navigating a calendar.

As illustrated, system 100 includes application(s) 110, calendar manager 26, service 105, tablet computing device 140, and computing device 150.

Calendar manager 26 is configured to perform operations relating to navigating a calendar. Calendar manager 26 progressively transitions between different calendar views being navigated. Instead of snapping the display to another calendar view, the view progressively transitions to an updated calendar view while receiving an interaction. For example, calendar 156 that is displayed on computing device 150 shows user 152 changing from a month view to a week view. As user 152 performs a stretch gesture, calendar manager 26 progressively transitions the week view being interacted with to a larger view. At the same time, calendar manager 26 smoothly decreases in size the view of the other weeks in the month while the interaction is being received. According to an embodiment, time periods farther away from the time period being interacted with change in size more quickly than time periods that are closer in time to the time period being interacted with. In the current example shown on computing device 150, the weeks of the $7^{th}$ and $21^{st}$ are shown decreasing in size slower than the first week and the last week of April.

A user may navigate between different calendar views such as year to month, month to week, week to multiple days, days to single days, and the like using calendar manage 26. When navigating month to month, week to week, day to day, and the like, the transitions between each time period are progressively transitioned (e.g. smoothly scrolled between the different time periods). For example, tablet 140 shows user 160 scrolling to the left to change the currently displayed days of calendar 142. As the user continues to scroll, the calendar portions displayed are updated by calendar manager 26 to progressively transition the calendar view to the updated calendar view.

Calendar manager 26 also changes the amount of information that is displayed on the calendar in response to a time period changing sizes. For example, calendar manage 26 may show more information on a displayed day when the display size for the time period increases and less information when the size of the time period decreases.

In order to facilitate communication with calendar manager 26, one or more callback routines, may be implemented. Application(s) 110 may be a variety of applications, such as business productivity applications, entertainment applications, music applications, travel applications, video applications, and the like. Generally, application(s) 110 may be any application that interacts with and/or displays a calendar. While calendar manager 26 is shown within an online service 105, calendar manager 26 may be stored and used on a single computing device (e.g. tablet 140 or computing device 150). The functionality of calendar manager 26 may be split between service 105 and some other location. The application(s) 110 may be configured to receive different types of input (e.g. speech input, touch input, keyboard input (e.g. a physical keyboard and/or Software Input Panel (SIP)) and/or other types of input.

System 100 as illustrated comprises one or more touch screen input devices, such as tablet computing device 140 that detects when a touch input has been received (e.g. a finger touching or nearly touching the touch screen). Any type of touch screen may be utilized that detects a user's touch input. More details are provided below.

Figure 2A:
FIG. 2A shows navigating between a month view and a week view.
Figure 2A:

FIG. 2A shows navigating between a month view and a week view.

Display 210 shows a month view of a calendar. In the current example, the month of April 2013 is displayed. A user may navigate to different time periods of the calendar using touch interaction and/or using other methods (e.g. mouse, speech, gestures, and the like). As illustrated, user 220 is performing a stretch gesture to navigate to a week view that includes April 18$^{th}$.

Display 250 shows that as user 220 performs the stretch gesture, the week view being interacted with progressively transitions to a larger view while the view of the other weeks in the month smoothly decreases in size while the interaction is being received. According to an embodiment, time periods farther away from the time period being interacted with changes in size more quickly than time periods that are close in time. In the current example shown on display 250, the weeks of the 7$^{th}$ and 21$^{st}$ are shown decreasing in size slower than the first week and the last week of April. According to another embodiment, the different time periods change in size the same amount as time period being interacted with changes size. When user 220 completes their interaction, the view of the week is shown on the calendar (See Display 310 in FIG. 3). If there was not enough time to smoothly transition to the week view while receiving the interaction, the transition may continue to occur until the week is fully displayed.

To move back to a month view from a week view, a user may perform a pinch gesture (or some other determined input method) to smoothly transition back to the month view.

Figure 2B:
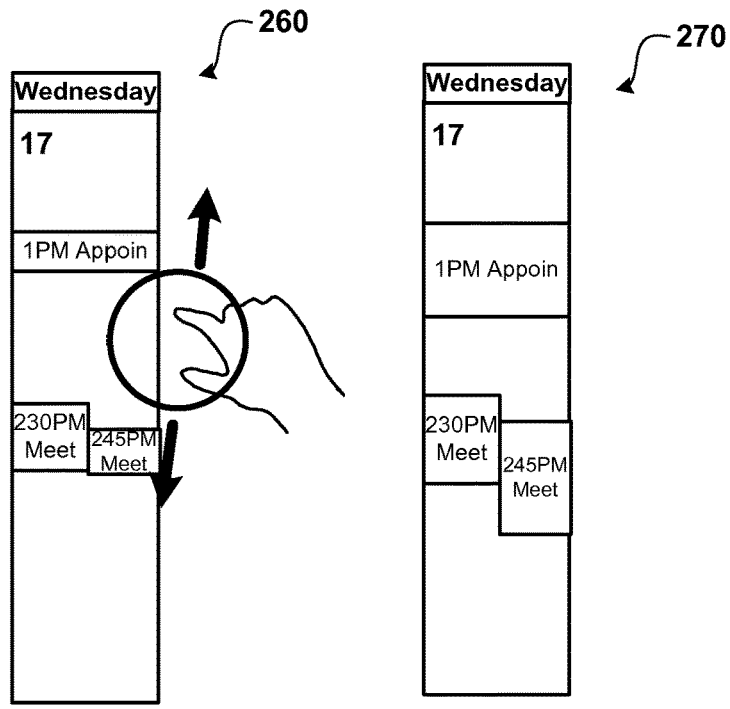
FIG. 2B shows how appointments change from a compressed view to an expanded view.

FIG. 2B shows how appointments change from a compressed view to an expanded view.

Display 260 shows that as user 220 performs the stretch gesture, the appointments shown for Wednesday, April 17th progressively transition from a compressed view as shown in display 250 to a larger view while the interaction is being received.

Display 270 shows a final display state of the appointments for Wednesday, April 17$^{th}$. As can be seen, the appointments progressively become larger and are displayed according to the appointment time. In the current example shown in display 260 and display 270 it can be seen that the 2:30 PM meeting and the 2:45 PM meeting conflict.

FIG. 3 shows navigating between a week view and a multi-day view.

Display 310 shows a week view of a calendar. In the current example, the week from the 14$^{th}$ to the 20$^{th}$ of April 2013 is displayed. A user may navigate to different time periods of the calendar using touch interaction and/or using other methods (e.g. mouse, speech, gestures, and the like). As illustrated, user 320 is performing a stretch gesture to expand a current view of a day (e.g. April 17$^{th}$).

Display 350 shows that as user 320 performs the stretch gesture, the day view being interacted with progressively transitions to a larger view while some of the other days in the displayed week smoothly decrease in size while the interaction is being received. According to an embodiment, when a user performs a stretch gesture while in a week calendar view, the days adjacent to the day being interacted with are also transitioned to a larger size. In the current example, April 16$^{th}$ and April 18$^{th}$ are also transitioned to a larger size. Other transitions may be performed. For example, the day being interacted with may become larger, more than two days may become larger, and the like. As illustrated, the days in the week that are farthest away from the day being interacted with change in size more quickly than the size of the days near the day being interacted with. In the current example shown on display 350, the days of April 14$^{th}$ and April 20$^{th}$ are shown decreasing in size faster than the days of April 15$^{th}$ and April 19$^{th}$. When user 320 completes their interaction, the multi-day view is shown on the calendar (See Display 410 in FIG. 4A). If there was not enough time to smoothly transition to the multi-day view while receiving the interaction, the transition may continue to occur until the multi-day view is fully displayed.

To move back to a week view from a multi-day view, a user may perform a pinch gesture (or some other determined input method) to smoothly transition back to the week view.

Figure 4B:
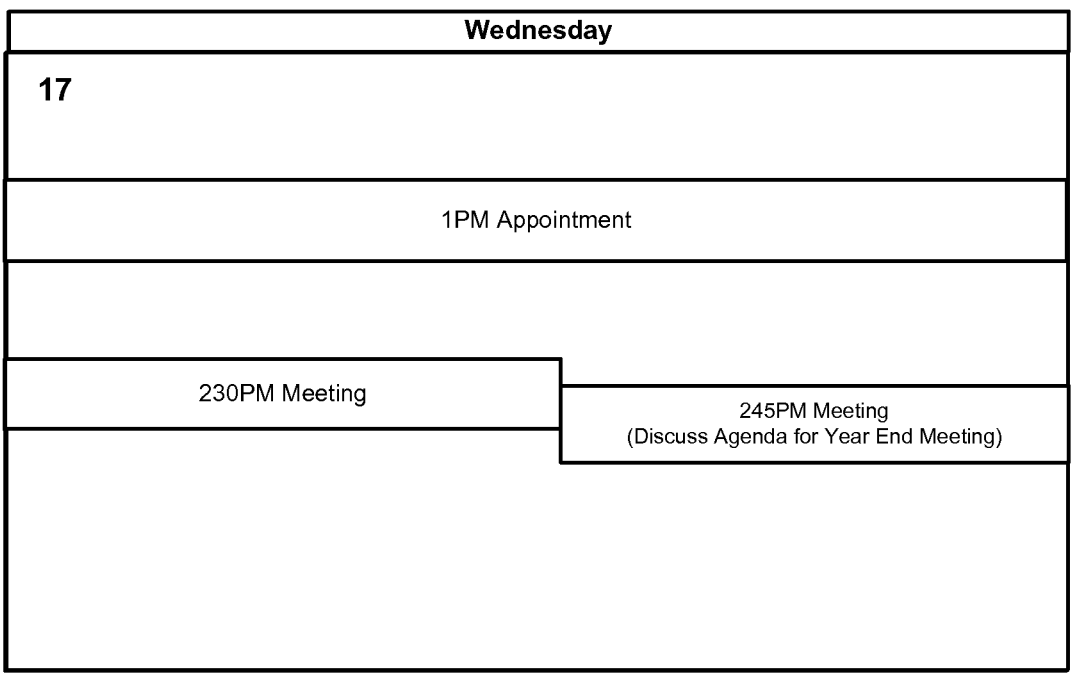

FIGS. 4A and 4B shows navigating between a multi-day view and a day view.

Display 410 shown in FIG. 4A shows a multi-day view of a calendar. In the current example, the days from the 16$^{th}$ to the 18$^{th}$ of April 2013 are displayed. As illustrated, user 420 is performing a stretch gesture to expand a current view of a day (e.g. April 17$^{th}$).

Display 450 shown in FIG. 4A shows that as user 420 performs the stretch gesture, the day view being interacted with progressively transitions to a larger view while the other days in the multi-day smoothly transition and decrease in size while the interaction is being received. In the current example shown on display 450, the days of April 16$^{th}$ and April 18$^{th}$ are shown decreasing in size while the stretch gesture is being received. When user 420 completes the interaction, the day view is shown on the calendar (See Display 480 in FIG. 4B). If there was not enough time to smoothly transition to the day view while receiving the interaction, the transition may continue to occur until the day view is fully displayed.

FIG. 4B shows a day view for a calendar. As can be seen by comparing FIG. 4A with FIG. 4B, more information is displayed in the 2:45 PM Meeting illustrated in FIG. 4B than is shown in the 2:45 PM Meeting shown in FIG. 4A.

To move back to a multi-day view from the day view, a user may perform a pinch gesture (or some other determined input method) to smoothly transition back to the multi-day view.

Figure 5:
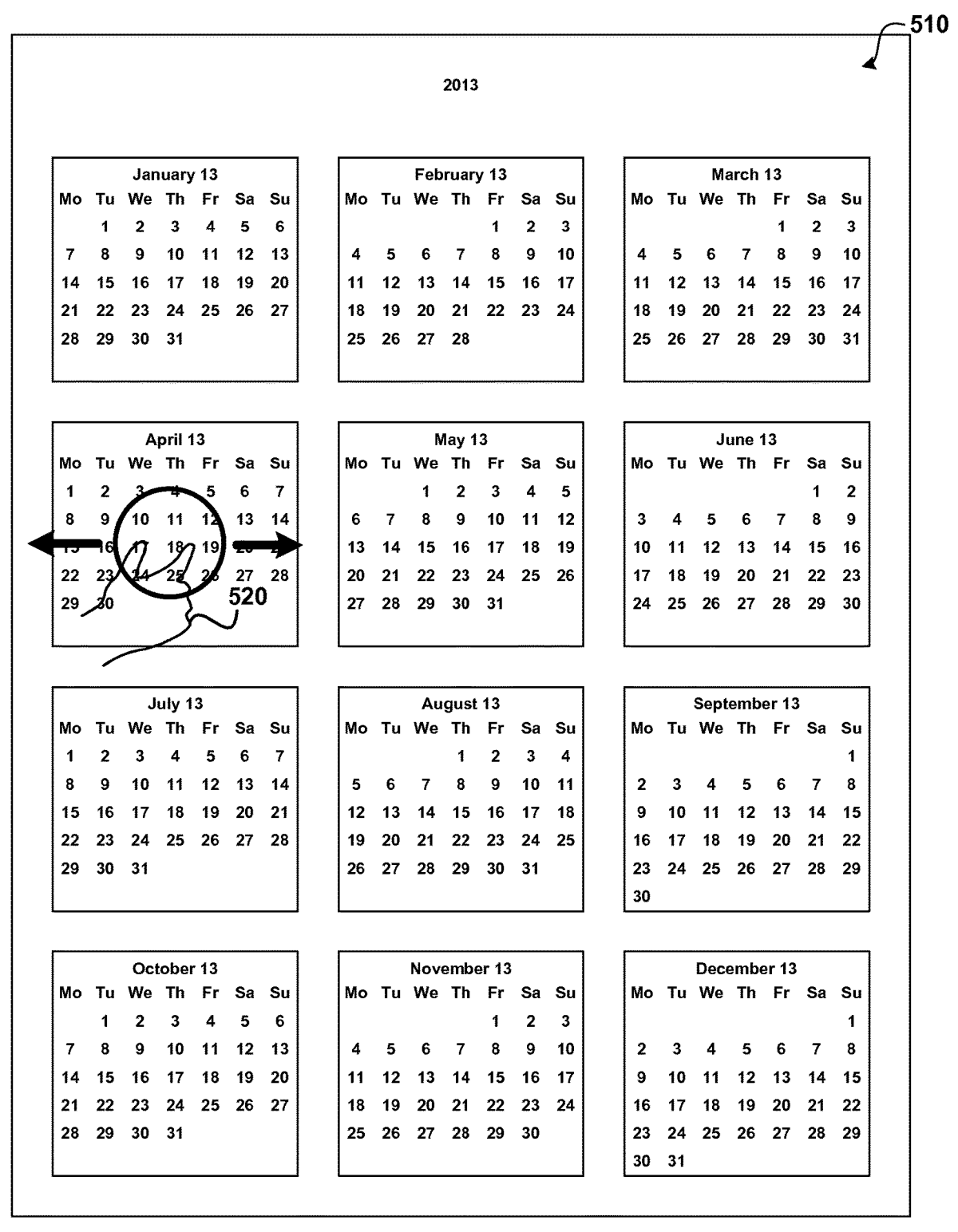

FIG. 5 shows navigating between a year view and a month view.

Display 510 shows a year view of a calendar. In the current example, the months of the year 2013 are displayed. As illustrated, user 520 is performing a stretch gesture to expand a current view of a month (e.g. April 17).

In response to receiving the stretch gesture, the year view may smoothly transition to a multi-month view or a single month view. The transitions to different time periods may be configured. Preferences may be configured that determine an action to occur in response to receiving different actions. For example, a user may configure preferences that when a stretch gesture is received on a particular month in a year view that the display of the calendar changes to a single month view. Another user may configure the year view to transition to a multi-month view in response to the interaction. If there is not enough time to smoothly transition to the updated calendar view while receiving the interaction, the transition may continue to occur until the calendar view is fully displayed.

To move back to a previous calendar view, a user may perform a pinch gesture (or some other determined input method) to smoothly transition back to the previous calendar view.

Figure 6:
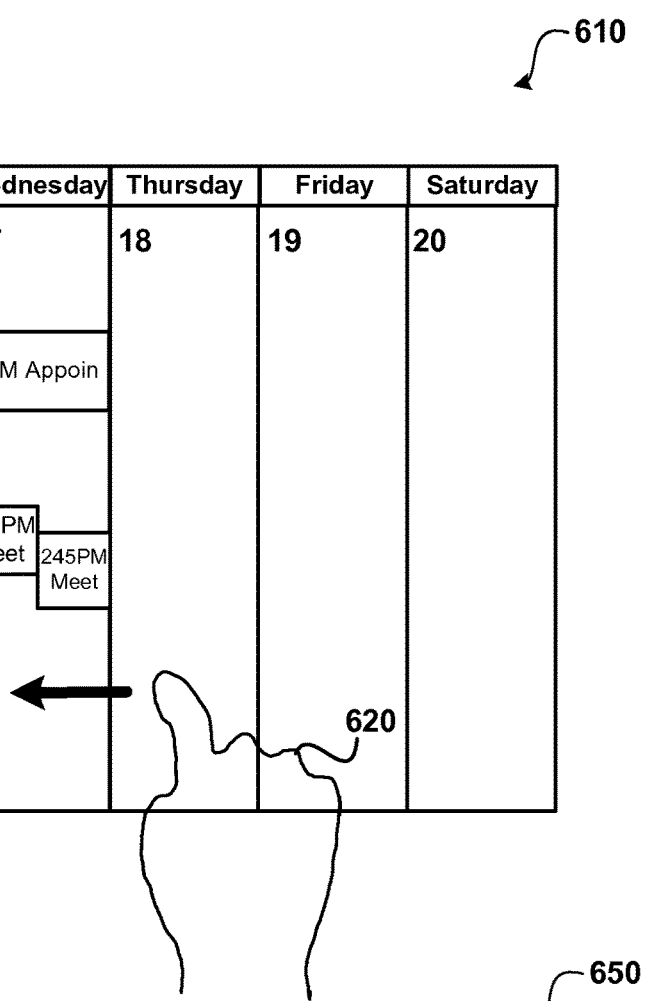
FIG. 6 shows changing the days displayed in a calendar view in response to receiving a panning interaction.
Figure 6:

FIG. 6 shows changing the days displayed in a calendar view in response to receiving a panning interaction.

Display 610 shows a week view of a calendar. In the current example, the week starting on April 14$^{th}$ of 2013 is displayed. As illustrated, user 620 is performing a panning gesture to change the days currently displayed in the week view.

Display 650 shows the updated display of the days of the week in response to receiving the panning gesture. In the current example, the user has updated the display to include April 21$^{st}$ and remove the display of April 14$^{th}$.

A panning gesture may be used to adjust the display of other time periods. For example, an up panning gesture or down panning gesture that is received while in a week view may transition to a next week view or a previous week view. The user may also navigate between years, months, weeks and days using panning gestures. Instead of snapping the calendar view to an updated view, the transition occurs smoothly and progressively.

Figure 7:
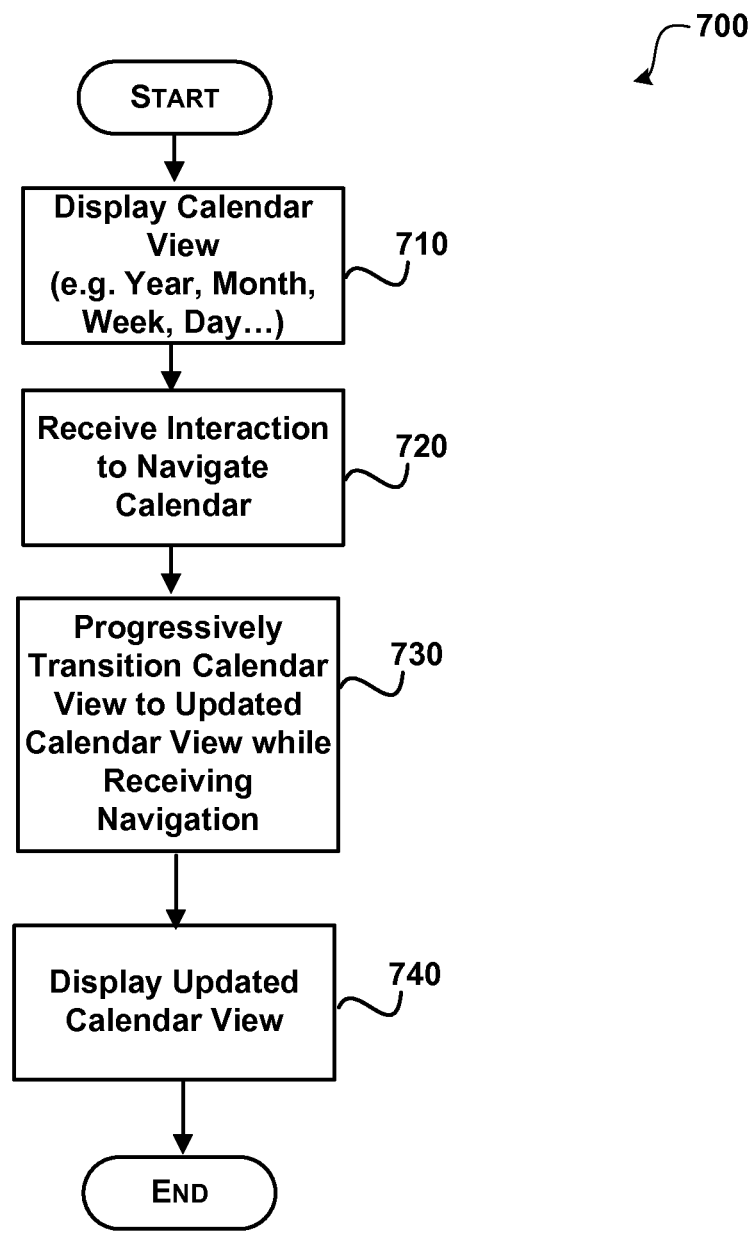
FIG. 7 shows a process for navigating a calendar using smooth and progressive transitions between calendar views.
Figure 8:
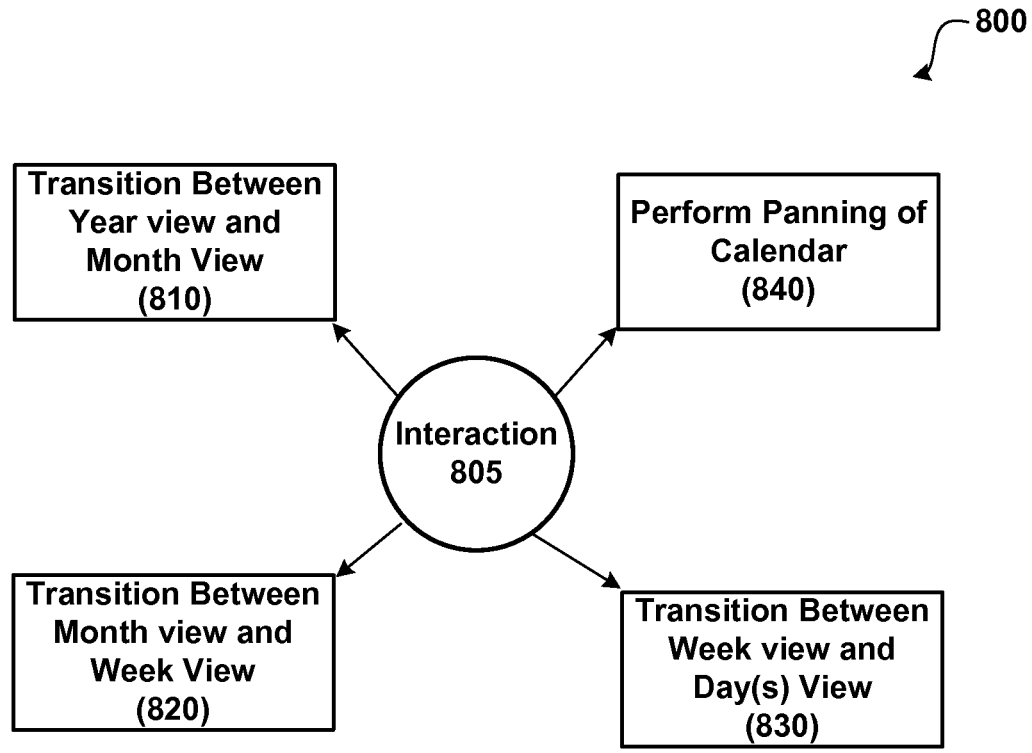
FIG. 8 shows receiving an interaction to transition between different calendar views.

FIGS. 7 and 8 illustrate navigating a calendar using smooth transitions. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change, be performed in parallel, depending on the implementation.

FIG. 7 shows a process for navigating a calendar using smooth and progressive transitions between calendar views.

After a start operation, the process moves to operation 710, where a calendar view is displayed. The calendar view may be any time period. For example, the calendar view may be a multi-year view, a year view, a multi-month view, a month view, a multi-week view, a week view, a multi-day view, and a day view.

Transitioning to operation 720, an interaction is received to navigate the calendar. Different types of interactions may be received. For example, the interactions may be made using touch input, speech input, gesture input, as well as other input methods. According to an embodiment, touch input is used to navigate the calendar. For example, a user may zoom into the calendar using a stretch gesture and zoom out using a pinch gesture. A user may also perform a swiping action to pan the calendar to show different time periods. For example, the swiping action may be an up swiping action, a down swiping action, a left swiping action, and a right swiping action.

Flowing to operation 730, the calendar view is progressively transitioned to an updated calendar view while receiving the interaction. Instead of changing the display from the current view to the new view without any transition (e.g. snapping the calendar view to the updated view), a smooth transition is made when changing the view of the calendar to the updated calendar view while the interaction is being received. For example, when changing the calendar view from a month view to a week view, the week being navigated to is progressively transitioned to a larger size as the other weeks in the month are progressively transitioned to not being displayed.

Transitioning to operation 740, the updated view of the calendar is displayed. According to an embodiment, an animation may be performed to continue the transition to the display of the calendar view to its final state. For example, the interaction may not have allowed enough time to smoothly transition between the current view of the calendar and the updated view of the calendar.

The process flows to an end operation and returns to processing other actions.

FIG. 8 shows receiving an interaction to transition between different calendar views.

Interaction 805 illustrates receiving an interaction to navigate a displayed calendar. As discussed, different types of interactions may be received to navigate the calendar. According to an embodiment, the interactions are directed at changing the time period displayed on the calendar. For example, the interaction may be a zoom interaction that transitions between different time periods or a panning interaction that changes the current time period that is displayed.

Operation 810 shows transitioning between a year view and a month view in response to an interaction. According to an embodiment, a stretch gesture (e.g. zoom in) interaction is received that progressively transitions the year view to the month view. A pinch gesture (e.g. zoom out) interaction may be received to progressively transition from a month view to a year view.

Operation 820 shows transitioning between a month view and a week view in response to an interaction. According to an embodiment, a stretch gesture (e.g. zoom in) interaction is received that progressively transitions the month view to the week view. A pinch gesture (e.g. zoom out) interaction may be received to progressively transition from a week view to a month view.

Operation 830 shows transitioning between a week view and a multi-day or day view in response to an interaction. According to an embodiment, a stretch gesture (e.g. zoom in) interaction is received that progressively transitions the week view to a day view. According to an embodiment, the week view transitions to a multi-day view before transitioning to the day view. A pinch gesture (e.g. zoom out) interaction may be received to progressively transition from the day view to a week view.

Operation 840 shows panning a calendar view in response to receiving a panning interaction. According to an embodiment, a swipe gesture (e.g. up, down, left, right) interaction is received that progressively transitions the display of the calendar to show different days, weeks, months or years. For example, a user may perform a swipe gesture to the left while in a week view to progressively transition the displayed days of the week to different days.

Figure 9:
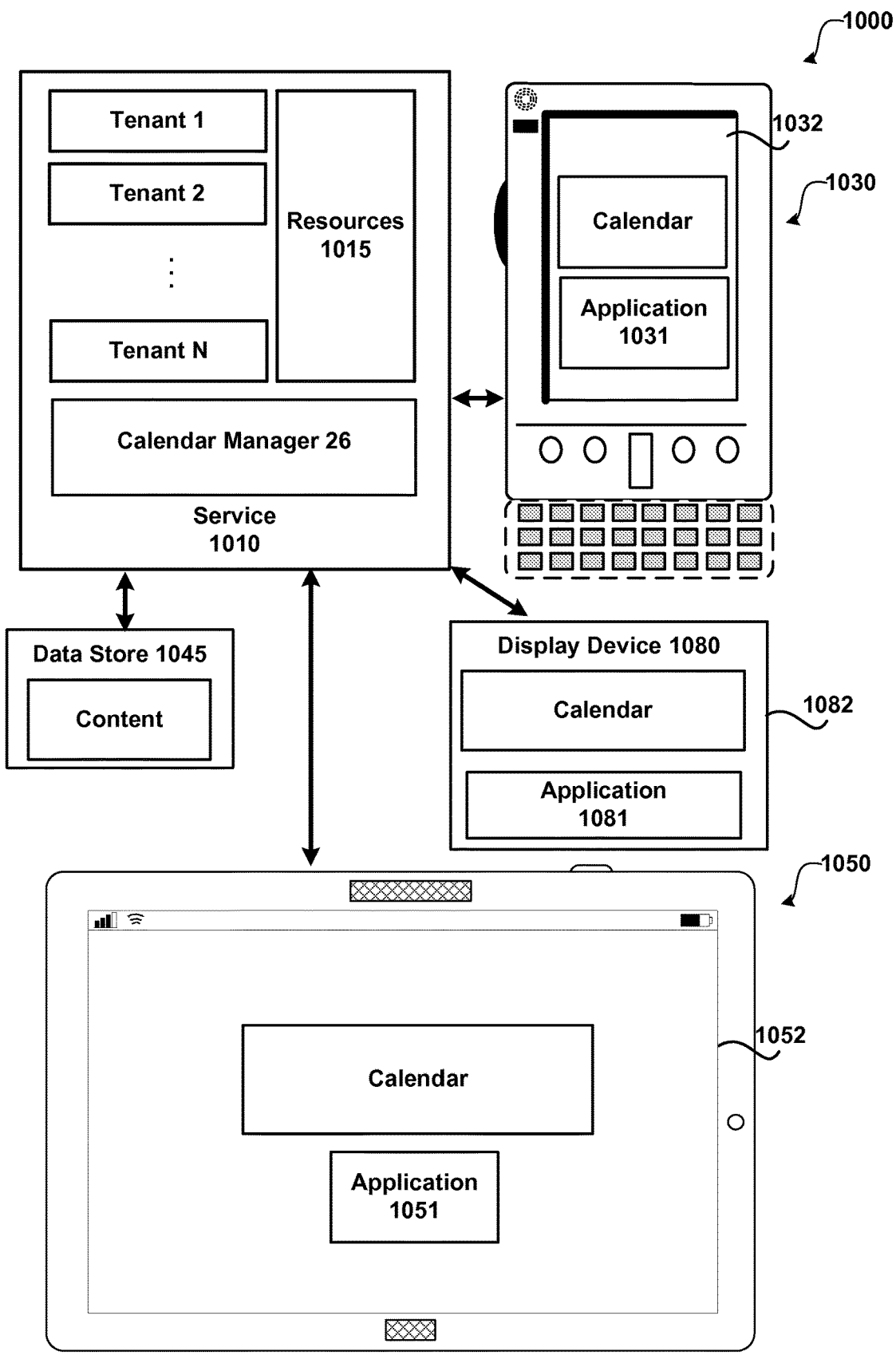
FIG. 9 illustrates an exemplary online system for navigating a calendar.

FIG. 9 illustrates an exemplary online system for navigating a calendar. As illustrated, system 1000 includes service 1010, data store 1045, touch screen input device 1050 (e.g. a table/slate), smart phone 1030 and display device 1080.

As illustrated, service 1010 is a cloud based and/or enterprise based service that may be configured to provide services including calendar services, such as services related to various applications or productivity services (e.g. spreadsheets, documents, presentations, charts, messages, and the like)). The service may be interacted with using different types of input/output. For example, a user may use speech input, touch input, hardware based input, and the like. The service may provide multi-modal output. Functionality of one or more of the services/applications provided by service 1010 may also be configured as a client/server based application.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include an application (1031, 1051, 1081) that uses a calendar.

As illustrated, touch screen input device 1050, smart phone 1030, and display device 1080 shows exemplary displays 1052/1032/1082 showing the use of an application, such as a calendar application. Data may be stored on a device (e.g. smart phone 1030, slate 1050 and/or at some other location (e.g. network data store 1045). Data store 1045, or some other store, may be used to store contextual information as well as other data. The applications used by the devices may be client based applications, server based applications, cloud based applications and/or some combination. According to an embodiment, display device 1080 is a device such as a MICROSOFT XBOX coupled to a display.

Calendar manager 26 is configured to perform operations relating to navigating a calendar as described herein. While manager 26 is shown within service 1010, the functionality of the manager may be included in other locations (e.g. on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
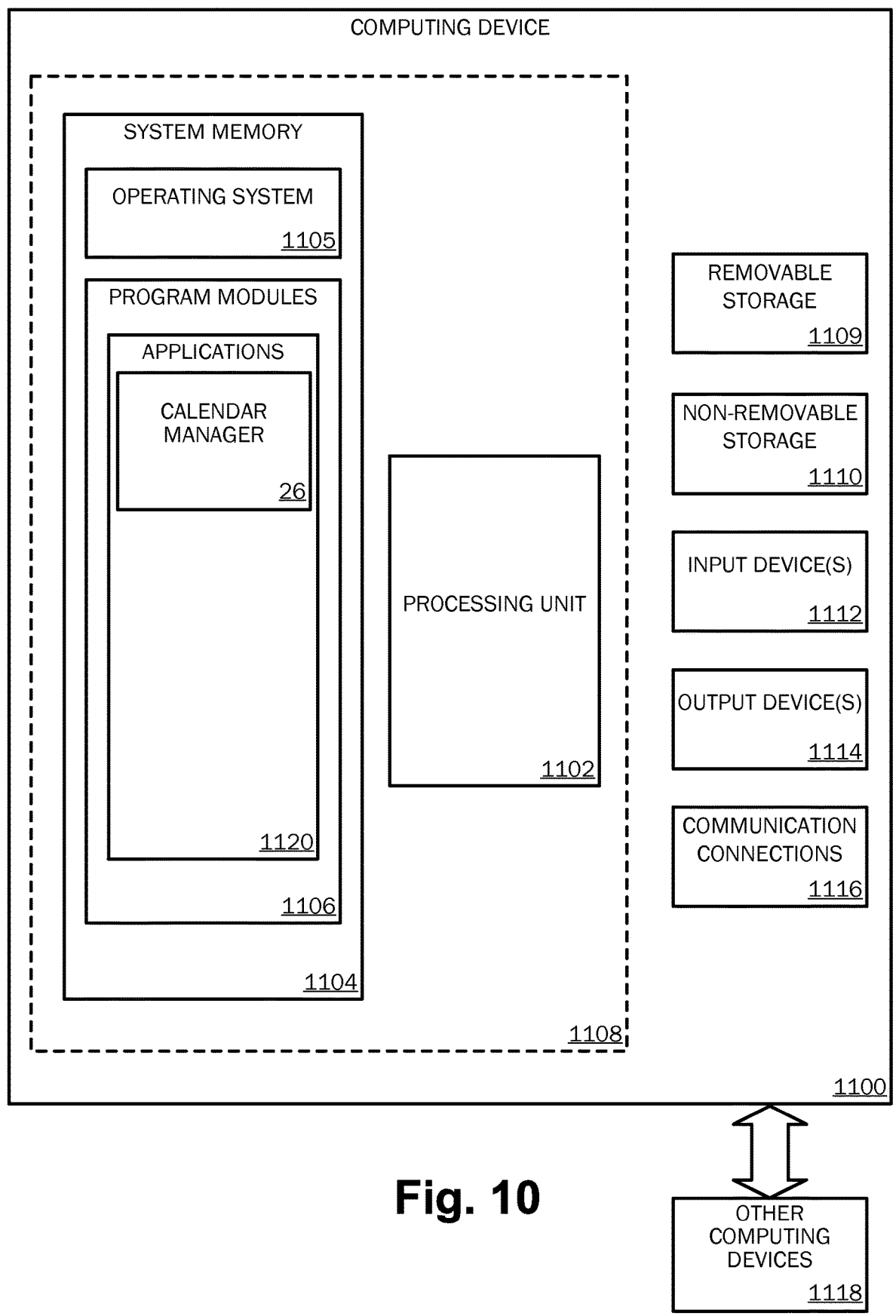
FIGS. 10, 11A, 11B and 12 and the associated descriptions provide a discussion of a variety of operating environments in which embodiments of the invention may be practiced.
Figure 11A:
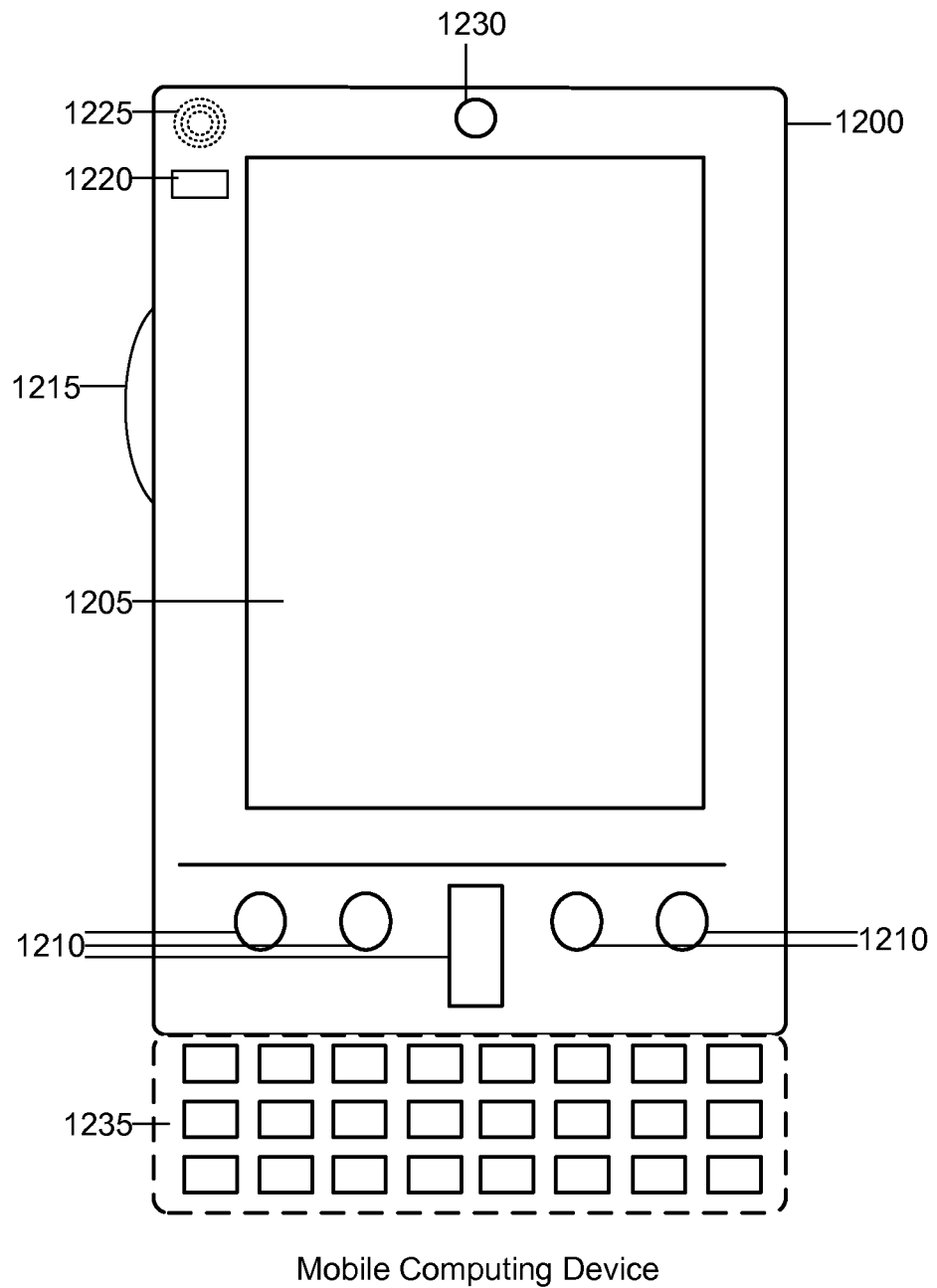
Figure 11B:
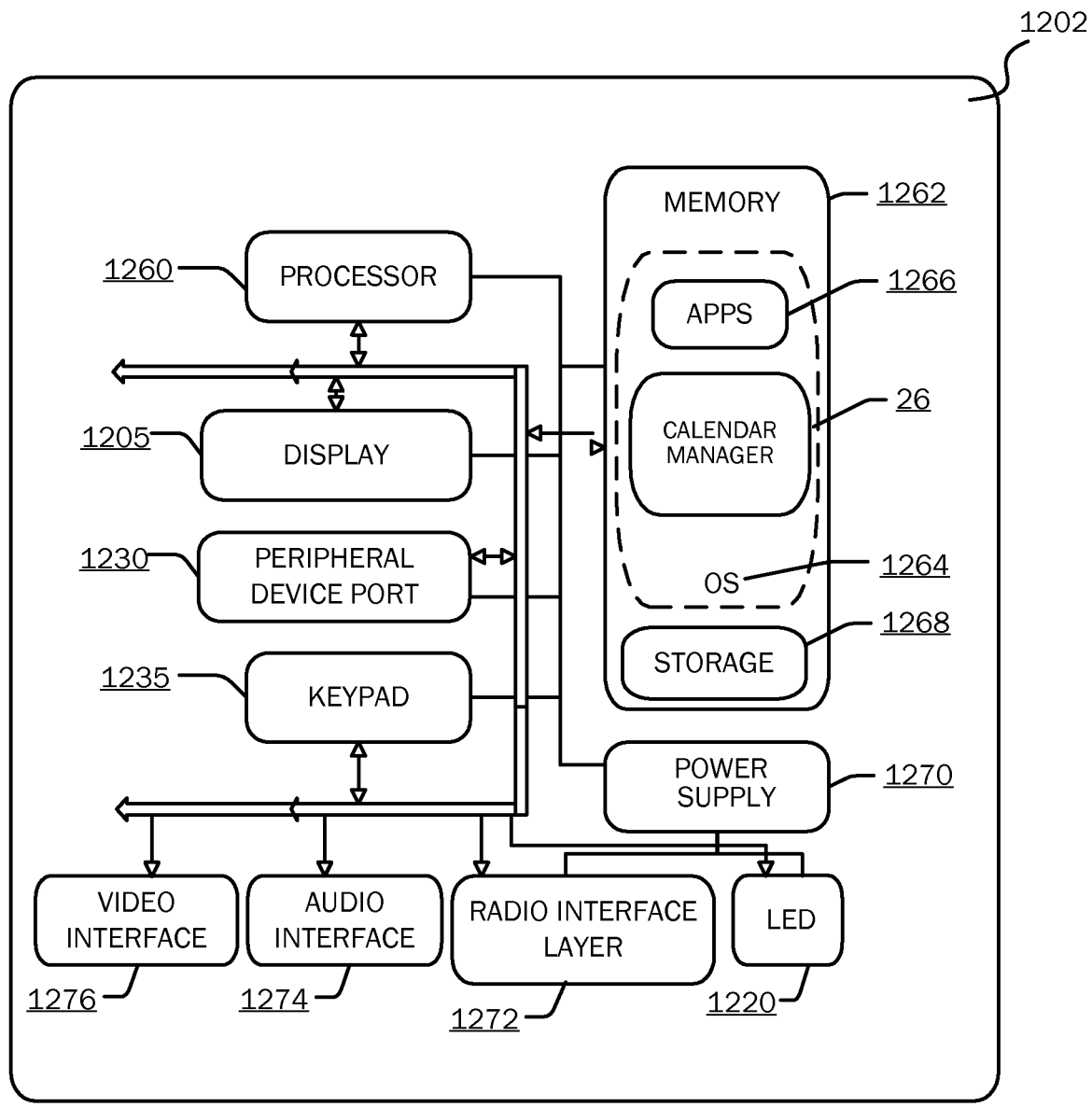
Figure 12:
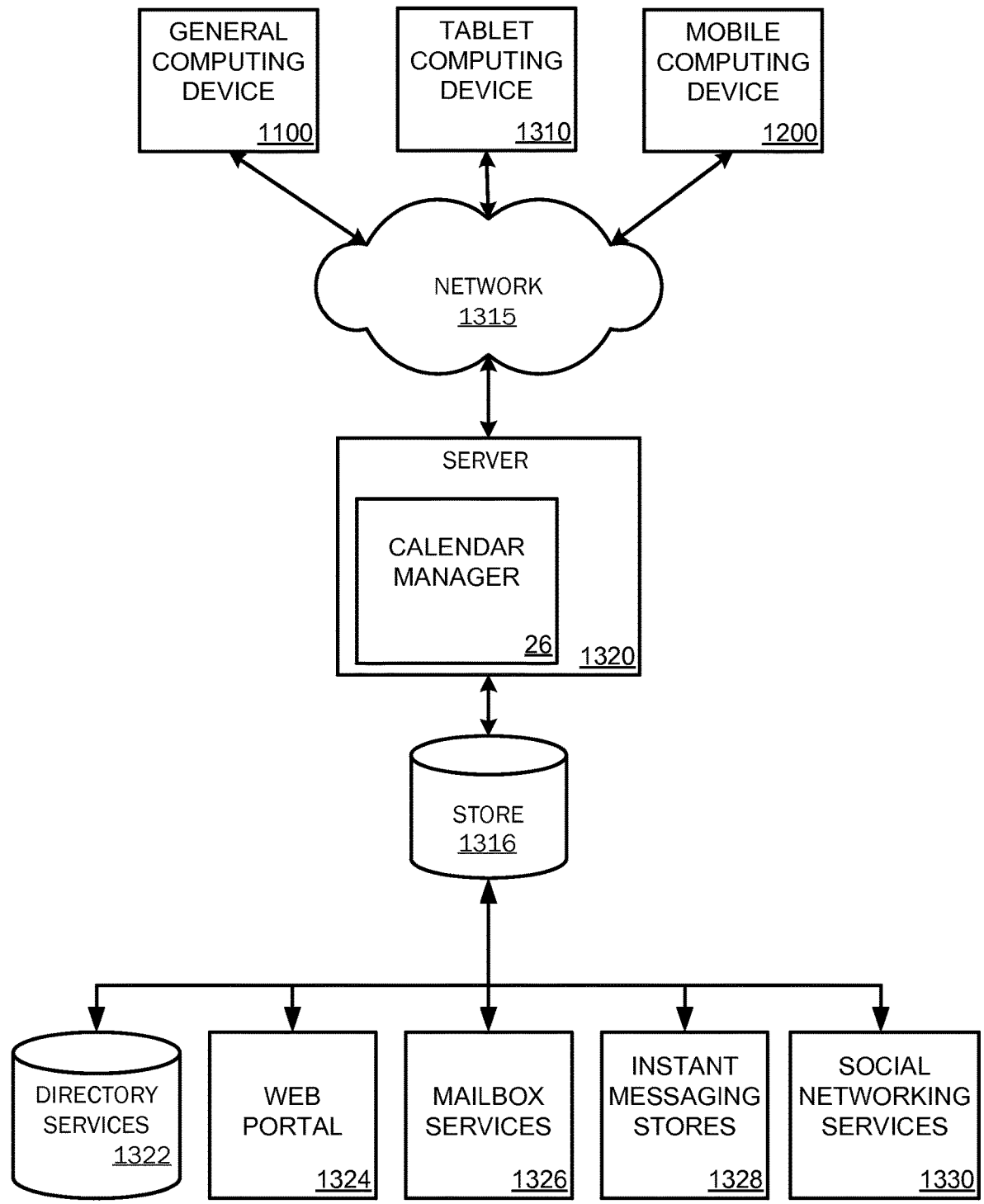

FIGS. 10-12 and the associated descriptions provide a discussion of a variety of operating environments in which embodiments of the invention may be practiced. However, the devices and systems illustrated and discussed with respect to FIGS. 10-12 are for purposes of example and illustration and are not limiting of a vast number of computing device configurations that may be utilized for practicing embodiments of the invention, described herein.

FIG. 10 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the calendar manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 10 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 10 by a removable storage device 1109 and a non-removable storage device 1110.

As stated above, a number of program modules and data files may be stored in the system memory 1104. While executing on the processing unit 1102, the program modules 1106 (e.g., the calendar manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the calendar manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1200, for example, a mobile telephone, a smart phone, a tablet personal computer, a laptop computer, and the like, with which embodiments of the invention may be practiced. With reference to FIG. 11A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the calendar manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 11B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 12 illustrates an embodiment of an architecture of an exemplary system, as described above. Content developed, interacted with, or edited in association with the calendar manager 26 may be stored in different communication channels or other storage types. For example, various documents may be stored using a directory service 1322, a web portal 1324, a mailbox service 1326, an instant messaging store 1328, or a social networking site 1330. The calendar manager 26 may use any of these types of systems or the like for enabling data utilization, as described herein. A server 1320 may provide the calendar manager 26 to clients. As one example, the server 1320 may be a web server providing the calendar manager 26 over the web. The server 1320 may provide the calendar manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for navigating a calendar, comprising:
receiving a configuration preference for a particular calendar view transition to occur in response to a given interaction to change a calendar view to an updated calendar view, wherein the configuration preference varies for different users and causes, for a first user, a first change in the calendar view that presents a view of a single time period for the given interaction, and for a second user, a different second change in the calendar view that presents a view of a multi-time period for the given interaction;
displaying the calendar view;
receiving the given interaction to change the calendar view to the updated calendar view; and
while the given interaction is being received, and based on the configuration preference associated with the given interaction, progressively transitioning the calendar view to the updated calendar view such that a displayed portion of the calendar view corresponding with the given interaction progressively increases in size and another displayed portion of the calendar view not corresponding with the given interaction progressively decreases in size,
wherein after completing the given interaction, the displayed portion of the calendar view is enlarged while the other displayed portion has reduced in size such that it has disappeared, thereby resulting in the updated calendar view; and
further wherein progressively transitioning the calendar view to the updated calendar view comprises progressively changing an amount of task information that is shown within the calendar view.

2. The method of claim 1, wherein progressively transitioning the calendar view to the updated calendar view comprises changing the calendar view from a year view to a month view by progressively expanding a size of a displayed week in a calendar from a first size to a second size as the given interaction is being received.

3. The method of claim 1, wherein progressively transitioning the calendar view to the updated calendar view comprises changing the calendar view from a month view to a week view by progressively expanding a size of a displayed week in a calendar from a first size to a second size.

4. The method of claim 1, wherein progressively transitioning the calendar view to the updated calendar view comprises progressively changing the calendar view from a week view to a day view by expanding a size of a displayed day in a calendar from a first size to a second size as the given interaction is being received.

5. The method of claim 1, wherein progressively transitioning the calendar view to the updated calendar view comprises progressively receiving a scrolling interaction that changes the calendar view from a first displayed time period to a second displayed time period.

6. The method of claim 1, wherein progressively transitioning the calendar view to the updated calendar view comprises progressively showing appointments that are in conflict next to each other when a size of the display area for a day increases to a week view.

7. The method of claim 1, wherein receiving the given interaction comprises receiving a touch interaction comprising:
a pinch gesture to zoom out;
a stretch gesture to zoom in; or
a swiping action to scroll the calendar view.

8. The method of claim 1, wherein progressively transitioning the calendar view to the updated calendar view comprises progressively expanding the calendar view to a single day view.

9. A computer storage media
storing computer-executable instructions for navigating a calendar, comprising:
receiving a configuration preference for a particular calendar view transition to occur in response to a given interaction to change a calendar view to an updated calendar view, wherein the configuration preference is different for different users and causes, for a first user, a first change in the calendar view that presents a view of a single time period for the given interaction, and for a second user, a different second change in the calendar view that presents a view of a multi-time period for the given interaction;
displaying the calendar view;
receiving the given interaction to change the calendar view to the updated calendar view; and
while the given interaction is being received, and based on the configuration preference associated with the given interaction, progressively transitioning the calendar view to the updated calendar view such that a displayed portion of the calendar view corresponding with the given interaction progressively increases in size and another displayed portion of the calendar view not corresponding with the given interaction progressively decreases in size,
wherein after completing the given interaction, the displayed portion of the calendar view is enlarged while the other displayed portion has reduced in size such that it has disappeared, thereby resulting in the updated calendar view; and
further wherein progressively transitioning the calendar view to the updated calendar view comprises progressively changing an amount of task information that is shown within the calendar view.

10. The computer storage media of claim 9, wherein progressively transitioning the calendar view to the updated calendar view comprises changing the calendar view from a year view to a month view by expanding a size of a displayed week in a calendar from a first size to a second size as the given interaction is being received.

11. The computer storage media of claim 9, wherein progressively transitioning the calendar view to the updated calendar view comprises changing the calendar view from a month view to a week view by expanding a size of a displayed week in a calendar from a first size to a second size.

12. The computer storage media of claim 9, wherein progressively transitioning the calendar view to the updated calendar view comprises changing the calendar view from a week view to a day view by expanding a size of a displayed day in a calendar from a first size to a second size as the given interaction is being received.

13. The computer storage media of claim 9, wherein progressively transitioning the calendar view to the updated calendar view comprises showing appointments that are in conflict next to each other when a size of the display area for a day increases to a week view.

14. The computer storage media of claim 9, wherein progressively transitioning the calendar view to the updated calendar view comprises expanding the calendar view from a view of two days to a view of a single day.

15. A system for navigating a calendar, comprising:
a processor and memory;
an operating environment executing using the processor; and
a calendar manager that is configured to perform actions comprising:
receiving a configuration preference for a particular calendar view transition to occur in response to a given interaction to change a calendar view to an updated calendar view, wherein the configuration preference is different for different users and causes, for a first user, a first calendar view transition that presents a view of a single time period for the given interaction, and for a second user, a different second calendar view transition that presents a view of a multi-time period for the given interaction;
displaying the calendar view;
receiving the given interaction to change the calendar view to the updated calendar view; and
while the given interaction is being received, and based on the configuration preference associated with the given interaction, progressively transitioning the calendar view to the updated calendar view such that a displayed portion of the calendar view corresponding with the given interaction progressively increases in size and another displayed portion of the calendar view not corresponding with the given interaction progressively decreases in size,
wherein after completing the given interaction, the displayed portion of the calendar view is enlarged while the other displayed portion has reduced in size such that it has disappeared, thereby resulting in the updated calendar view; and
further wherein progressively transitioning the calendar view to the updated calendar view comprises progressively changing an amount of task information that is shown within the calendar view.

16. The system of claim 15, wherein progressively transitioning the calendar view to the updated calendar view comprises one of:
changing the calendar view from a year view to a month view by expanding a size of a displayed week in a calendar from a first size to a second size as the given interaction is being received;
changing the calendar view from a month view to a week view by expanding a size of a displayed week in a calendar from a first size to a second size; or
changing the calendar view from a week view to a day view by expanding a size of a displayed day in a calendar from a first size to a second size as the given interaction is being received.

17. The system of claim 15, wherein progressively transitioning the calendar view to the updated calendar view comprises showing appointments that are in conflict next to each other when a size of the display area for a day increases to a week view.

18. The method of claim 1, wherein:
the configuration preference comprises a first configuration preference;
the given interaction comprises a first interaction;
the updated calendar view comprises a first updated calendar view; and
the method further comprises:
receiving a different second configuration preference for another particular calendar view transition to occur in response to a second interaction to change the calendar view to a second updated calendar view;
receiving the second interaction to change the calendar view to the second updated calendar view; and
while the second interaction is being received, and based on the second configuration preference associated with the second interaction, progressively transitioning the calendar view to the second updated calendar view such that a displayed portion of the calendar view corresponding with the second interaction progressively increases in size and another displayed portion of the calendar view not corresponding with the second interaction progressively decreases in size.

19. The method of claim 1, wherein a first time period in the another displayed portion of the calendar view decreases in size more quickly than a second time period in the another displayed portion, where the second time period is closer to the displayed portion than the first time period.

20. The system of claim 15, wherein a first time period in the another displayed portion of the calendar view decreases in size more quickly than a second time period in the another displayed portion, where the second time period is closer to the displayed portion than the first time period.

* * * * *